Aug. 31, 1943.  E. T. LINDEROTH  2,328,220
ROTARY DEFLECTION SEPARATOR
Original Filed Dec. 15, 1938   3 Sheets-Sheet 2
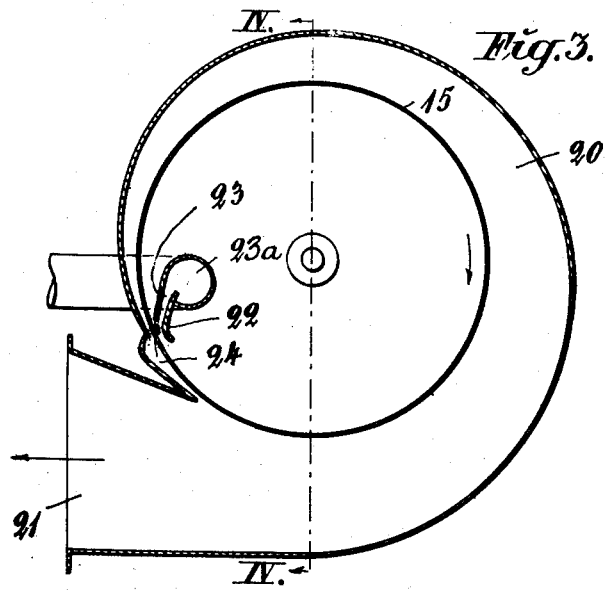
Fig. 3.
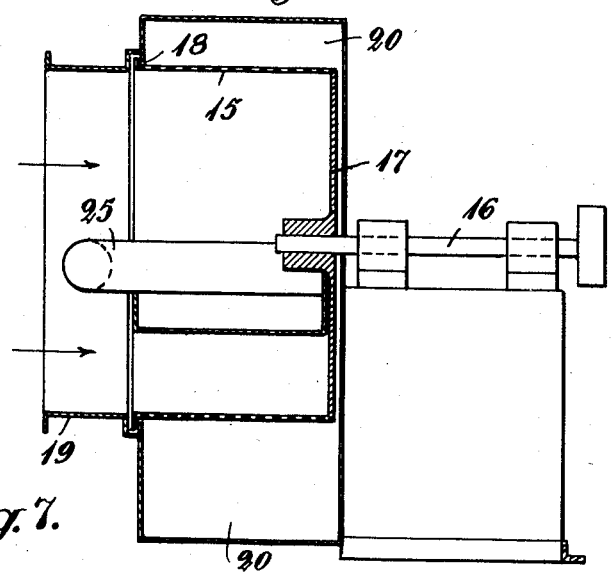
Fig. 4.
Fig. 7.
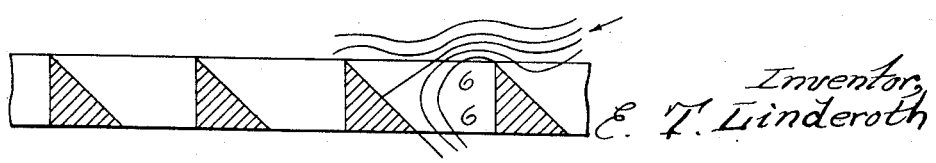
Inventor
E. T. Linderoth
By: Glascock Downing & Seebold
Attys.

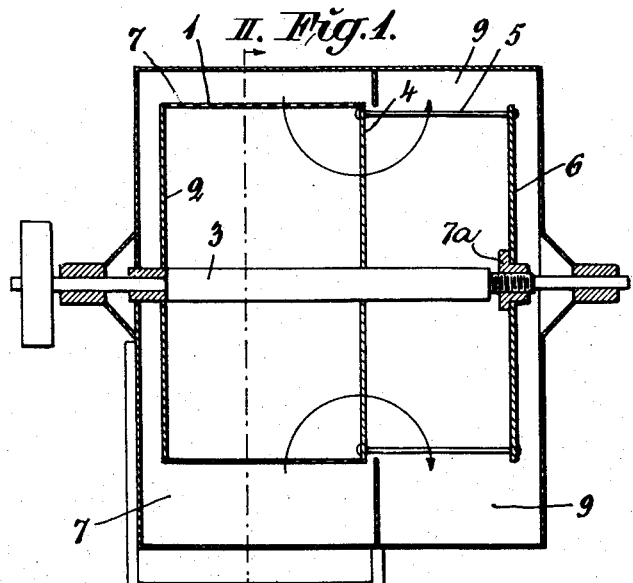
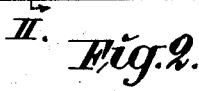
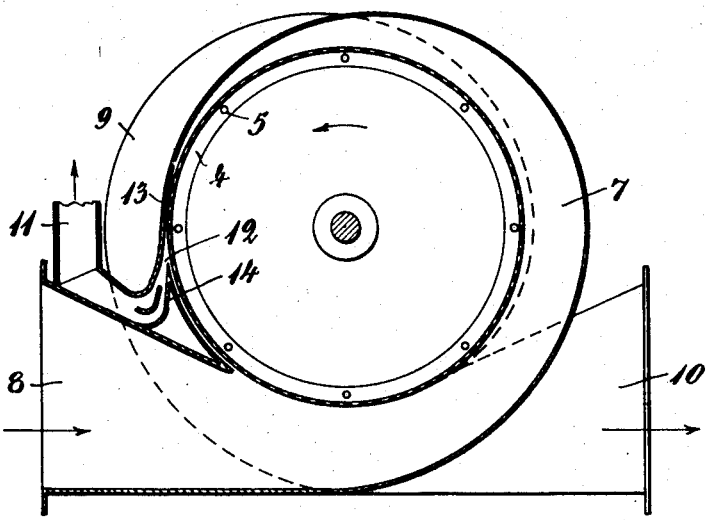

Aug. 31, 1943.  E. T. LINDEROTH  2,328,220
ROTARY DEFLECTION SEPARATOR
Original Filed Dec. 15, 1938  3 Sheets-Sheet 3
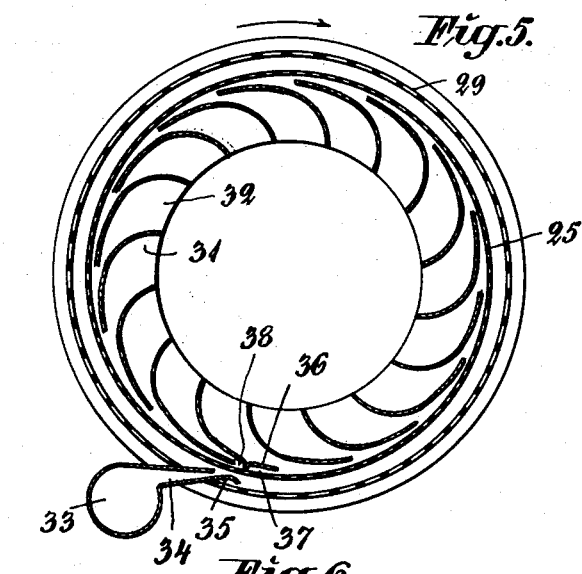
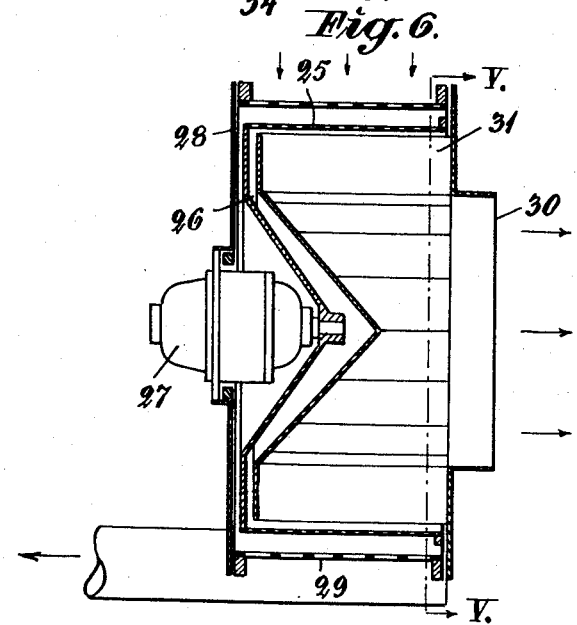
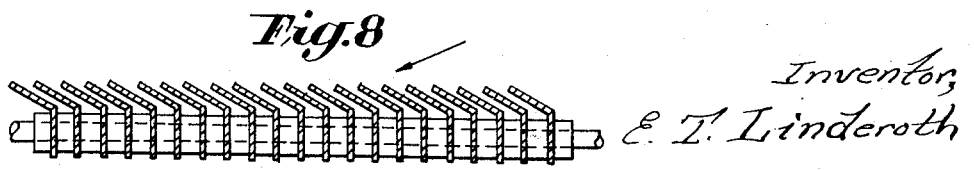
Inventor,
E. T. Linderoth
By: Glascock Downing Diebold
Attys.

Patented Aug. 31, 1943

2,328,220

UNITED STATES PATENT OFFICE 2,328,220

ROTARY DEFLECTION SEPARATOR

Erik Torvald Linderoth, Enkoping, Sweden

Original application December 15, 1938, Serial No. 245,990. Divided and this application December 9, 1939, Serial No. 308,493. In Sweden December 18, 1937

5 Claims. (Cl. 183—77)

The present invention relates to rotary deflection separators for treating air and gases and for the removal of the finest and lightest particles, such as dust in air, flue gas particles and the like, and that at the same time the separator elements are of such a design that the danger of clogging is removed.

The separator, according to the invention, is based on the aerodynamic principle for removal of fine particles which is thoroughly explained in my co-pending patent application No. 245,990 of Dec. 15, 1938, of which this application is a division which principle is based on the fact that the air or gas to be treated is directed against the separator surface at such a small oblique angle and at such a velocity in relation to the separator surface that the solid particles that enter the openings of the separator element are thrown against the walls of said openings at points that are situated in front of or outside the aerodynamic staying point so that the solid particles that are thus arrested by the separator surface are thrown back by aerodynamic action and then caught by and removed from the separator surface by an air or gas current, which may be a portion of the original air or gas current directed against the separator surface.

In case of a rotating cylindrical separator surface, the velocity of flow of the air or gas relative to the separator surface is the resultant of the velocity of the air or gas and the peripheral velocity of the separator surface, and therefore, the latter velocity is selected so high that said resultant velocity forms the necessary small oblique angle relatively to the separator surface.

The particles that by aerodynamic action of the separator are prevented from passing therethrough tend to accumulate on or close to the separator surface and would therefore after a short time interfere with the functioning of the separator by reducing the aerodynamic forces so that the particles would begin to penetrate the separator surface. To prevent this, the particles must be removed as fast as they accumulate.

A primary object of the present invention is to provide in rotary deflection separators an efficient device for removing the accumulating particles, and said device according to the invention includes a discharge conduit for carrying away the solid separated particles accumulating on or adjacent the rotating separator surface provided with an inlet opening extending along the whole active separator surface in the axial direction of the latter and situated close to the separator surface, said inlet opening being combined with a device for blowing or sucking the accumulating particles into said inlet opening by means of a gas or air current.

The device for blowing or sucking the accumulating particles into said inlet opening may for instance be adapted to blow the particles by means of a portion of the untreated gas or air current driven against the separator surface, in which case said device may consist of a curved channel arranged peripherally along the separator surface, which channel is connected to said inlet opening and adapted to lead the scavenging gas or air current along the separator surface.

According to another embodiment, the device for blowing the accumulating particles into said inlet opening consists of a channel opening close to the separator surface on the side opposite to said inlet opening and adapted to direct a scavenging gas or air current through the separator surface into said inlet opening.

A number of embodiments of a rotary deflection separator according to the invention are diagrammatically illustrated on the accompanying drawings.

Fig. 1 is an axial section through one of the embodiments, and Fig. 2 is a cross-section taken along the line II—II in Fig. 1.

Fig. 3 is a cross-section through a second embodiment, and Fig. 4 an axial section taken along the line IV—IV in Fig. 3.

Fig. 5 is a cross-section of a third embodiment taken on the line V—V in Fig. 6, and Fig. 6 shows an axial section through the same.

Figs. 7 and 8 are sections through two different embodiments of the separator surface.

In Figs. 1 and 2, I designates the surface of the rotary cylindrical deflection separator element provided with filter openings for the passage of the gas or air current. The surface may consist of metal wire cloth or perforated sheet metal. When using metal wire cloth a special-woven wire cloth may be used, which substantially consists of weft wires and which does not contain more warp wires than is necessary to hold the weft wires together. The cloth may then be formed as a cylinder in such a manner that the weft wires extend axially.

A suitable embodiment of the surface consists of a special-made perforated plate in which the bars between the holes are shaped in the manner shown in Fig. 7. The rotor may alternatively be composed of plates according to Fig. 8, the plates being so turned in relation to the direction of rotation that the motion relative to the air will be as indicated by the arrow in Fig. 8.

Owing to the scale on which the parts in Figs. 1 to 6 are shown, the exact form of the surface 1 is not apparent but the specific details may, as will be understood, be in accordance with those shown in Figs. 7 or 8.

The cylindrical surface 1 is at its one end attached to a disc 2, which is secured on the rotary drive shaft 3, while the other end of the surface is secured to a ring 4. This ring is by means of a number of bracing rods 5 connected to a disc 6 mounted on the shaft 3. If the surface consists of wire cloth, it may be stretched, as the disc 6 is mounted on a sleeve 7a that is screwed onto the shaft 3 so that the disc 6 may be displaced by turning the sleeve 7a. By means of the braces 5 the axial wires in the surface 1 may be stretched. This is a great advantage as it has proved to be difficult to weave the cloth material so that the weft wires are absolutely straight. The axial stretching of the cloth entails also the advantage that the wire cloth cylinder will be as evenly round as possible.

The rotary deflection separator is at the same time adapted to propel the gas or air current to be filtered. For this purpose the channel 7, through which the gas or air is admitted, is formed as a spiral-shaped channel surrounding the surface 1. The channel 7 is connected to an inlet 8 having a gradually decreasing cross-sectional area in the direction of the flow. The channel 7 has a cross-sectional area which gradually diminishes in the direction of flow of the air or gas current, which is the same as the direction of rotation of the surface 1. The air or gas is thus led through the channel 7 around the cylinder in the direction of rotation of the latter at the same time as the air or gas is directed into the cylinder from without. Due to the increased velocity which the air obtains in the inlet spiral 7 before the entrance into the separator cylinder, the losses due to impact of the air against the cylinder are reduced. The treated air or gas then flows as indicated by arrows in Fig. 1 into a second spiral shaped outlet channel 9, which is arranged at the open side of the drum so that it communicates with the interior of the latter. The flow area of the channel 9 widens gradually in the direction of rotation of the surface 1, and its wide end portion is connected to an outlet 10 adapted as a diffuser, whereby the kinetic energy of the air is transformed into pressure energy.

The dust that is prevented from passing through the deflection separator tends to accumulate on or close to the surface 1 and is removed by the following means.

A discharge conduit for the accumulating particles is shown at 11. To this discharge conduit an inlet opening 12 is connected, which inlet opening is arranged close to the surface 1 and is suitably slot-shaped and extended along the entire active separator surface in the axial direction of the latter, and adapted to cooperate with a channel 13 that conveys a scavenging air or gas current along the surface into the inlet opening 12 bringing along the solid particles. In Figs. 1 and 2, the channel 13 consists of the narrowest portion of the spiral-channel 7, and the scavenging air is thus a portion of the untreated air current directed towards the separator. After removal of the dust, the air current led off through the conduit 11 may be returned to the main untreated air current at some convenient place in the supply conduit.

The inlet opening 12 is connected to the discharge conduit 11 by means of a tube 14 widening as a diffuser so that a suction effect is produced whereby the removal of the particles is facilitated.

A condition for the fine dust really being sucked away is, however, that the inlet opening 12 is arranged in immediate vicinity of the separator cylinder with the least possible clearance.

In the embodiment according to Figs. 3 and 4, one end of the separator cylinder 15 provided with openings is secured to a disc 17 mounted on the rotary shaft 16, while the other end of the cylinder is stiffened by a ring 18. The air or gas to be treated is admitted centrally through the channel 19 into the interior of the cylinder, is then passed through the cylinder and thrown out into a channel 20 which is spiral-shaped arranged around the cylinder and having an area increasing in the direction of rotation of the cylinder 15. The channel 20 is connected to an outlet 21. To remove the separated particles accumulating close to the interior surface of the cylinder, a discharge conduit 23a is provided, which conduit is connected to a suitably slot-formed inlet opening 22, which is arranged close to the separator surface and is extended along the entire active separator surface in the axial direction of the latter. The opening 22 is suitably connected to the conduit 23a by means of a tube 23 adapted as a diffuser. On the opposite side of the separator surface in relation to the inlet opening 22 a channel 24 is provided, which channel opens close to the separator surface opposite the inlet opening 22 and is adapted to direct a scavenging gas or air current through the separator surface into the inlet opening 22 so that the particles are removed. The channel 24 may for example as shown be formed as a diffuser so that the scavenging current obtains over-pressure. The channel 24 is in other words arranged on the pressure side of the separator while the diffuser channel 23 simultaneously effects a sucking action. This embodiment is preferably intended for the separation of lighter particles such as dust in air.

In the embodiment according to Figs. 5 and 6, the separator cylinder 25 provided with filter openings is attached to the disc 26 secured to the shafts of the motor 27. The filter is mounted inside a housing 28, and the gas or air is admitted through a cylindrical protecting grate 29. The housing 28 is provided with a central outlet 30 for the treated gas or air. The gas or air is thus admitted radially from the outside all around the whole separator surface. A rim of stationary guide vanes 31 are provided inside the cylinder. The ends of the vanes turned towards the cylinder 25 form a small angle with the tangent of the cylinder surface at a point where an extension of the vane edge would intersect the cylinder. The curvature of the vanes is small nearest to the cylinder but increases inwards so that the interior ends of the vanes terminate substantially in a radial direction. Between adjacent vanes a channel 32 is formed, which channel widens in the direction of flow of the treated air. Provided that the widening of said channel is not too great, the channels 32 will act as diffusers so that the pressure is increased in the direction of flow. By giving suitable dimensions and shape to the vanes, said increase of pressure may be greater than the total resistance to flow through the system, whereby a separate fan for driving the air current through the separator will be unnecessary. It is even possible to obtain such a high overpressure inside the vane rim that the resistance to flow in a pipe conduit, through which the treated air is led to the place of consumption, is overcome.

A condition for such propelling includes the feature that the vane angle does not exceed 20° and that the first portion of said intermediate channels 32 nearest to the inlet edge is not widened a greater angle than at the most 30° for a distance corresponding to a relation of widening of 2:1 of the cross-sectional area of the channel. If it is not sufficient that the apparatus is blown clean but that also the greatest possible static pressure head is to be obtained, it is suitable to use at the most half as large angles.

For scavenging the separator surface free from accumulating particles, an inlet opening 35 for the particles leading to a discharge conduit 33 by way of a diffuser channel 34 is provided close to the separator surface on the outside of the latter. The opening 35 extends in the axial direction along the whole active width of the separator surface. Opposite the opening 35 and on the inside of the separator surface a screen 36 is provided close to the separator surface. The screen 36 extends along the whole width of the separator surface so that a channel 37 is formed, by means of which a portion of the air or gas is returned through the separator surface into the inlet opening 35 to sweep away the particles. Alternatively or together with the screen 36 the opening of a guide vane channel 32 situated right opposite the inlet opening 35 may be shaped as a scavenging air channel 38 as indicated in Fig. 5. Due to the over-pressure inside the guide vane rim and the suction effect of the diffuser channel 34 the air is pressed back through the channel 38 and through the separator into the inlet opening 35 and scavenges the separator surface clean.

Having now particularly described the nature of my invention and the manner of its operation what I claim is:

1. A rotary deflection separator for a gaseous medium comprising, a housing, a rotor mounted within said housing having a surface provided with gas flow impelling means and openings for the medium, means for rotating said surface at a high peripheral velocity, means for leading a current of the medium to be treated against one side of the rotating surface, a diffuser channel arrangement communicating with the opposite side of the rotating surface to receive the filtered medium and adapted to assist in creating a drop in static pressure between the opposite sides of the said surface and to transform kinetic energy of the medium after passing through the rotating surface into pressure energy for further transport of the treated medium, a discharge conduit on the inlet side of the surface for carrying away the separated solid particles accumulating close to the rotating surface, said discharge conduit being provided with an inlet opening for said solid matter situated close to the surface, and means for directing a jet of scavenging gaseous medium to blow said solid particles into said inlet opening.

2. A rotary deflection separator for a gaseous medium comprising, a housing, a rotor mounted within said housing having a cylindrical surface provided with gas flow impelling means and openings for the medium, means for rotating said cylinder at a high peripheral velocity, a spiral-shaped inlet channel surrounding said cylinder and leading a current of the medium to be filtered about and through the cylindrical surface, said channel having a gradually diminishing cross-sectional area in the direction of flow and in the direction of rotation of the cylinder, a diffuser channel arrangement communicating with the inside of the cylinder to receive the treated medium and adapted to assist in creating a drop in static pressure between the opposite sides of the surface and to transform kinetic energy of the medium after passing through the rotating surface into pressure energy for further transport of the medium, a discharge conduit on the outside of the cylinder for carrying away the separated solid particles accumulating close to the rotating surface, said discharge conduit being provided with an inlet opening for said solid matter situated close to the surface and communicating with the narrowest portion of said spiral-shaped inlet channel so that a portion of the originally admitted gaseous medium current will as a jet blow said solid particles into said inlet opening.

3. A rotary deflection separator for a gaseous medium comprising, a housing, a rotor mounted within said housing having a cylindrical surface provided with gas flow impelling means and openings for the medium, means for rotating said cylinder at a high peripheral velocity, a spiral shaped inlet channel surrounding said cylinder and leading a current of the medium to be treated about and through the cylindrical surface, said channel having a gradually diminishing cross-sectional area in the direction of flow and in the direction of rotation of the cylinder, a spiral-shaped outlet channel for the treated medium communicating with the interior of the cylinder and located at an open side of the latter and having a cross-sectional area which gradually increases in size in the direction of rotation of the cylinder and terminates with a widening diffuser pipe, the latter spiral-shaped channel and diffuser being adapted to assist in creating a drop in static pressure between the opposite sides of the surface and to transform kinetic energy of the treated medium into pressure energy for further transport of the same, a discharge conduit on the outside of the cylinder for carrying away the separated solid particles accumulating close to the rotating surface, said discharge conduit being provided with an inlet opening for said solid matter situated close to the surface and communicating with the narrowest portion of said spiral-shaped inlet channel so that a portion of the originally admitted medium current will as a jet blow said solid particles into said inlet opening.

4. A rotary deflection separator for a gaseous medium comprising, a housing, a rotor mounted within said housing having a cylindrical surface provided with gas flow impelling means and openings for the medium, means for rotating said cylinder at a high peripheral velocity, means for leading a current of the gaseous medium to be treated against the inside of the rotating cylinder, a spiral-shaped outlet channel for the treated medium surrounding the cylinder and having a cross-sectional area which increases in size in the direction of rotation of the cylinder and is terminated by a widening diffuser pipe, said channel and diffuser arrangement being adapted to assist in creating a drop in static pressure between the opposite sides of the surface and to transform kinetic energy of the treated medium into pressure energy for further transport of the same, a discharge conduit on the inside of the cylinder for carrying away the separated solid particles accumulating close to the rotating surface, said discharge conduit being provided with an inlet opening for said solid matter situated close to the surface, a channel leading from the aforesaid diffuser pipe on the outside of the cylinder to a point opposite said inlet opening and being adapted to blow a jet of scavenging air from the diffuser and through the rotating surface into said inlet opening to sweep away said solid matter.

5. A rotary deflection separator for a gaseous medium, a rotor mounted within said housing having a cylindrical surface provided with gas flow impelling means and openings for the medium, means for rotating said cylinder at a high peripheral velocity, the outside of the cylinder being adapted as inlet side for a current of the medium to be treated, a rim of stationary guide vanes mounted inside the cylinder so shaped as to form all around the inside of the cylinder a plurality of outlet channels for the treated medium which widen as diffusers in the direction inwards and are provided with inlet portions being obliquely directed towards the interior periphery of the cylinder in the direction opposite the direction of rotation of the latter so that the diffuser channels assist in creating a drop in static pressure between the opposite sides of the surface and transform kinetic energy of the gaseous medium current after passing through the surface into pressure energy for the further transport of the treated medium, a discharge conduit on the outside of the cylinder for carrying away the separated solid particles accumulating close to the rotating surface, said discharge being provided with an inlet opening for said solid matter situated close to the surface, a channel arranged on the inside of the surface adapted to lead a current of scavenging air from a diffuser channel to a point close to the surface and opposite said inlet opening to sweep said solid matter into said inlet opening by a jet of scavenging medium passing through the surface.

ERIK TORVALD LINDEROTH.